Aug. 19, 1952     C. W. McCOY     2,607,811
HIGH VOLTAGE SPARK GAP VOLTMETER WITH MICROMETER SCALE
Filed July 12, 1948
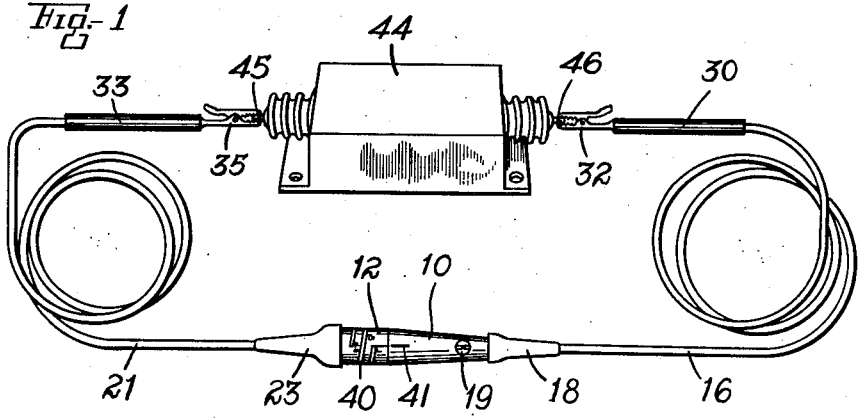
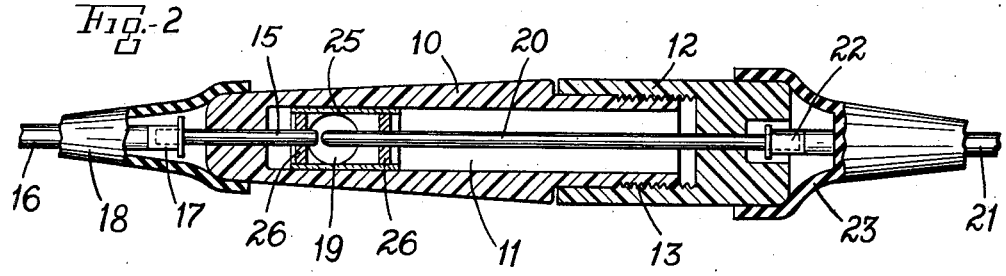
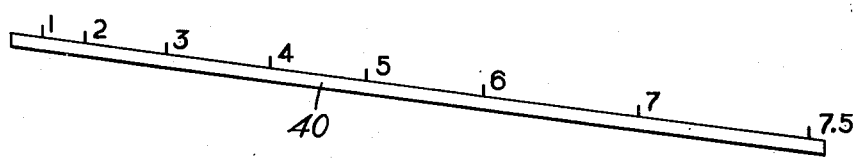
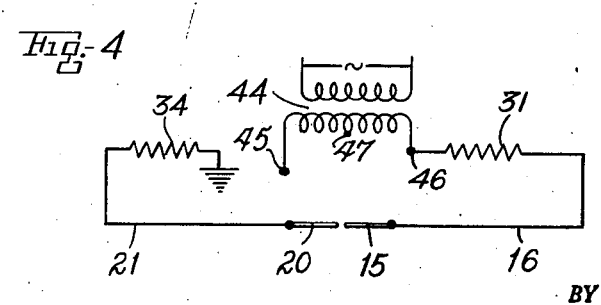
INVENTOR.
Charles W. McCoy
BY
Marechal & Biebel
ATTORNEYS Patented Aug. 19, 1952

2,607,811

UNITED STATES PATENT OFFICE 2,607,811

HIGH-VOLTAGE SPARK GAP VOLTMETER WITH MICROMETER SCALE

Charles W. McCoy, Dayton, Ohio

Application July 12, 1948, Serial No. 38,285

3 Claims. (Cl. 171—95)

1

This invention relates to a device for testing the voltage output of transformers, particularly transformers of the character used in high tension systems such as neon light systems, ignition systems and the like.

One of the principal objects of the invention is to provide a device for testing the voltage of a transformer which is quick and easy to use and economical to produce, and which is of simple and strong construction capable of giving accurate test results over a long useful life.

Another object is to provide such a testing device which employs an adjustable spark gap in combination with a simple scale of the micrometer type for measuring the voltage output of a transformer, and wherein the connecting leads to the spark gap include resistors establishing a predetermined limit for the current flow through the device in accordance with the voltage ranges under test.

Other objects and advantages of the invention will be apparent from the following description, the accompanying drawing and the appended claims.

In the drawing—

Fig. 1 is a perspective view showing a testing device in accordance with the invention in operative position for checking the voltage of a transformer;

Fig. 2 is an enlarged view in longitudinal section through the body of the testing device of Fig. 1;

Fig. 3 is an enlarged developed view of the scale of the testing device; and

Fig. 4 is a wiring diagram illustrating the operation of the device.

Referring to the drawing, which illustrates a preferred embodiment of the invention, the device includes a body member 10 of a phenolic resin or other suitable non-conducting material having a chamber 11 therein open at one end. A second body member or cap 12 similarly formed of non-conducting material is threaded on the open end of body member 10 as indicated at 13. An electrode 15 is mounted in body member 10 with its inner end projecting into the chamber 11, and its outer end is electrically connected with a suitable test lead 16 of high voltage flexible wire. This connection is formed by a friction clip 17 at the end of lead 16 adapted to receive the end of electrode 15, and it is reinforced by a rubber sleeve

2

18 carried by the lead and frictionally gripping the end of body member 10 to complete a quickly detachable connection.

The body member 10 is provided with a pair of opposed viewing apertures 19, and the electrode 15 is so positioned in the body member that its inner end extends into line with these viewing apertures. A second electrode 20 is mounted in the cap 12 of the device, and it is adapted to extend through chamber 11 to form an adjustable spark gap with the electrode 15. The outer end of electrode 20 is connected with a test lead 21 similar to the lead 16, this connection including a clip 22 similar to clip 18 and a rubber sleeve 23 frictionally gripping the end of cap 12.

It will also be noted in Fig. 2 that the inner ends of the two electrodes are received within a transparent cell unit of the type disclosed in my application, Serial No. 734,398, filed March 13, 1947, now Patent No. 2,482,017, issued September 13, 1949. This cell unit comprises a tube 25 formed of transparent dielectric material such as glass of such outer diameter as to fit snugly within the chamber 11. At opposite ends of tube 25 are annular plates 26 of brass or other suitable conducting material of such inner and outer diameters as to fit closely within the tube 25 and to make electrical contact with the electrodes 15 and 20 while still permitting relative movement of the electrodes for adjustment of the gap therebetween. This cell thus provides for ready viewing of the spark gap but supplies protection against interference with the operation of the device by dust or other foreign matter or by the pressure, humidity and other atmospheric factors in the immediate vicinity of the device.

The test lead 16 provided at its free end with a probe member 30 of phenolic resin or other suitable non-conducting material which contains an electrical resistor 31 (Fig. 4) of suitable value for limiting the current flow through the device in use. A spring clip 32 is connected with the outer end of the resistor 31 and probe member 30, the latter thus providing a convenient handle for the test lead facilitating the desired connections with the clip 32. The lead 21 is provided with a similar probe member 33 containing a resistor 34 and having a clip 35 at its outer end. Satisfactory results in the practice of the invention for testing transformers over a voltage range up to approximately 15,000 volts have been obtained with the resistors 31 and 34 each of a value of 2 megohms.

The body of the device is provided with a suitable scale calibrated in accordance with the width of the spark gap and the resistance of the resistors 31 and 34 for measuring the voltage output of a transformer. This scale includes a suitably calibrated spiral line 40 on the cap 12 which is adapted to register with an index mark 41 on body member 10 to form a micrometer type of scale, the zero position of the scale indicating that the electrodes 15 and 20 are in contact. This scale will accordingly hold a given position after proper adjustment of the width of the spark gap for convenient reading either before or after the device is disconnected or the power turned off. The scale may be calibrated as desired, the calibration preferably being in R. M. S. values as distinguished from peak values, to thus correspond with the transformer rating.

Fig. 1 shows the device in position for checking the voltage on a transformer 44 having a maximum voltage output of not more than 7500 volts.

For such use, the power is turned off and clips 32 and 35 are connected with the high voltage terminals 45 and 46 of the transformer. Then after adjustment of the device by relative rotation of cap 12 and body member 10 to an expected approximate reading on scale 40, the power is turned on and the device further adjusted to the maximum width of the spark gap continuously jumped by a spark. This is readily done with satisfactory accuracy by first widening the gap until the spark ceases and then reclosing it until a continuous spark appears. It is then merely necessary to read the voltage directly as indicated by the position of scale 40 with respect to index mark 41.

For testing a transformer having a voltage output within the range of 7500 to 15,000 volts, the device is connected to only one high voltage terminal at a time. Thus as indicated in Fig. 4, the lead 16 may be connected to terminal 46 but the lead 21 is grounded, for example by clipping the clip 35 to the case of the transformer and leaving terminal 45 open, and the center tap of the transformer may be similarly grounded to the transformer case as indicated at 47. These connections are made while the power is off, and after the power is turned on, the device is adjusted and read as already described. Since this procedure checks only one-half the high voltage winding of the transformer, the power is then turned off and the connections reversed, one test lead being connected to the terminal 45 and the other grounded. The sum of the two readings thus obtained will be the voltage output of the transformer as a whole.

It will accordingly be seen that the invention provides a device of simple, lightweight and rugged construction which is quickly and easily used to give dependently accurate results, and it is therefore well adapted for use in checking the voltage output of the transformers in high tension systems such as ignition systems and the operating circuits for neon tubes. The probe members on the test leads of the device provide convenient handles to facilitate the necessary connections in use, and they also serve as convenient housings for the proper current limiting resistors, thus contributing to the economical production of the device. Furthermore, if either of these leads should be damaged, it can be quickly replaced without affecting the remainder of the device. It will also be noted that the device can be disconnected or the power turned off before the actual reading is taken, the device requiring connection in the circuit under test only long enough for adjustment to the maximum width of the spark gap continuously jumped by the spark. This in turn minimizes the time during which the spark is jumping and prevents possible overheating of the air in the spark gap cell, which tends to give a slightly higher reading than the actual voltage. However, if overheating should occur, the proper accuracy will be restored by allowing the device to cool for a few minutes before further use.

While the form of apparatus herein desrribed constitutes a preferred embodiment of the invention, it is to be understood that the invention is not limited to this precise form of apparatus, and that changes may be made therein without departing from the scope of the invention which is defined in the appended claims.

What is claimed is:

1. A portable voltage testing device of the character described comprising a pair of adjustably connected body members of non-conducting material adapted to be held in the hand of the user, electrodes carried by said body members for cooperation to form a spark gap within one of said body members adjustable in accordance with the relative adjustment of said body members, extended flexible leads electrically connected with said electrodes for connecting said spark gap in series with a source of voltage to be tested, at least one of said leads including electrical resistance means of predetermined value for limiting the current flow through said device, index means on one of said body members, and a scale arranged circumferentially on the other said body member for cooperation with said index means and calibrated in accordance with the resistance of said resistance means and the width of said gap for measuring the voltage effective on said device.

2. A portable voltage testing device of the character described comprising a threaded pair of body members adapted to be held in the hands of the user and having an adjustable connection therebetween, electrodes carried by said body members for cooperation to form a spark gap within one of said body members adjustable in width in accordance with the relative rotation of said body members, means for connecting said spark gap in series with a source of voltage to be tested, electrical resistance means connected in series with said spark gap and on at least one side thereof for limiting the current flow therethrough, index means on one of said body members, and a scale arranged circumferentially on the other said body member for cooperation with said index means and calibrated in accordance with the resistance of said resistance means and the width of said spark gap for measuring the voltage effective on said device.

3. A portable testing device of the character described comprising an elongated main body including two body members adapted to be held in the hands of the user and connected for rotational adjusting movement and enclosing a chamber having a viewing aperture therein, electrodes carried by said body members and extending into said chamber to form a spark gap adjustable in accordance with the relative adjustment of said body members and visible through said aperture, said electrodes extending outwardly from the ends of said body members, extended flexible leads for connecting said device in a circuit to be tested, means at one end of each said lead for frictionally gripping the outer end of one of said electrodes, an elastic sleeve carried by each said lead adjacent said gripping means thereon and projecting beyond said gripping means for frictionally gripping the end of the adjacent body member, each of said leads having a handle portion adjacent the opposite end thereof from said gripping means, and each said handle portion including a resistor for predeterminedly limiting the current flow through said device.

CHARLES W. McCOY.

REFERENCES CITED

The following references are of record in the file of this patent:

UNITED STATES PATENTS

| Number | Name | Date |
|---|---|---|
| 1,506,180 | Humphreys et al. | Aug. 26, 1924 |
| 1,561,362 | Slepian | Nov. 10, 1925 |
| 1,615,788 | Feldkamp | Jan. 25, 1927 |
| 1,735,593 | Zitzmann | Nov. 12, 1929 |
| 2,076,618 | Cooper | Apr. 13, 1937 |
| 2,157,823 | Hubel | May 9, 1939 |
| 2,213,297 | Zitzmann | Sept. 3, 1943 |